Sept. 2, 1958 J. D. SCHILLER 2,849,879
TEST PROBE
Filed Aug. 22, 1956
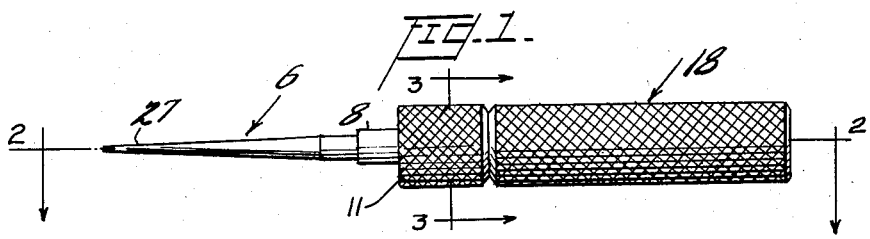
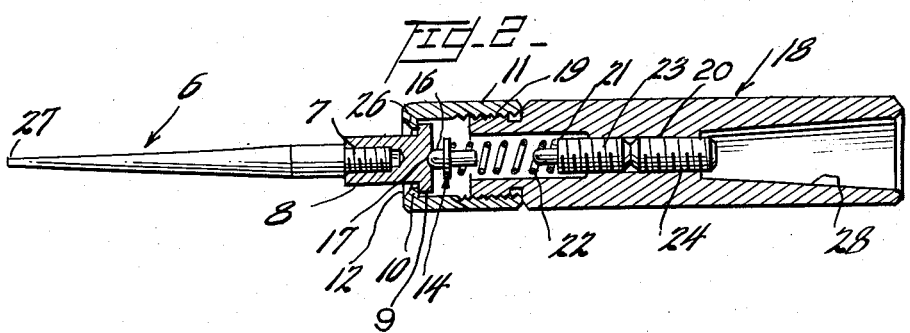
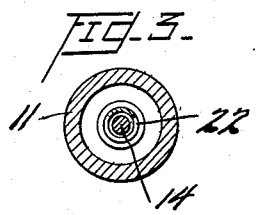
INVENTOR
Jacob D. Schiller,
BY A. C. Schwarz, Jr.
ATTORNEY United States Patent Office 2,849,879
Patented Sept. 2, 1958

2,849,879

TEST PROBE

Jacob D. Schiller, Winston-Salem, N. C., assignor to Western Electric Company, Incorporated, New York, N. Y., a corporation of New York Application August 22, 1956, Serial No. 605,624

1 Claim. (Cl. 73—141)

This invention relates to test equipment, and more particularly to a test instrument for determining when a predetermined force is applied to an object under test.

In the manufacture of resistors, for example, one known type of resistor is enclosed in a metal encasement with a metal cap soldered thereon. It is necessary to determine if the soldered joint is sufficiently strong to hold the cap on the encasement to enable the enclosure to withstand any external forces which may tend to separate the casement and the cap during the installation and/or use of such resistors. In the testing of such soldered joints to determine when they are sufficiently strong, it is necessary to prevent excessive forces from being applied which would break connections which are otherwise sufficiently strong to secure the cap to the encasement and withstand any external forces which the joint may be subjected to under normal use. Further, in making soldered connections between conductors and electrical elements or connectors, such connections should be sufficiently good to withstand easy separation, and any method of testing should not be such as to break or separate good connections.

It is therefore one of the objects of this invention to provided a test instrument which may be used to determine whether or not soldered connections possess proper properties; to wit, to enable it to withstand a predetermined tensile force.

It is another object of this invention to provide a test probe which will deflect when a predetermined amount of force is applied thereto to enable an operator to know when a proper amount of force is being applied to the end of the probe.

It is still a further object of this invention to provide a test probe, the end of which will deflect with respect to the handle when a predetermined force is applied to the end thereof.

Other objects and features of the invention will be more readily understood from the following detailed description when read in conjunction with the accompanying drawings, in which:

Fig. 1 shows a view of the preferred test probe embodied in the invention;

Fig. 2 shows an enlarged cross-sectional view of the test instrument taken substantially on line 2—2 of Fig. 1; and Fig. 3 shows a cross-sectional view of the test instrument taken substantially on line 3—3 of Fig. 1.

Referring now to the drawings wherein like reference numerals designate similar elements throughout the several views, the test instrument comprises a substantially conically shaped probe, designated generally by the numeral 6, and having external threads 7 adjacent one end thereof which are threaded into an internally threaded substantially cylindrical member 8. The cylindrical member 8 has a flange 9 adjacent one end thereof which is encompassed by an internally threaded cap member 11. The cap member 11 has an aperture 12 in one end thereof which is large enough for the reception of the cylindrical member 8 and small enough to prevent the flange 9 on the end of the cylindrical member 8 from passing therethrough. The material of the cap member 11 forming the aperture 12 also forms an inwardly extending projection or shoulder 10. A flanged member 14 having a rounded end 16 is positioned in an indentation 17 in the flanged end of the cylindrical member 8. An internally threaded, knurled, cylindrical handle portion, designated generally by the numeral 18, has external threads 19 adjacent one end thereof which are adapted to be threaded into the cap member 11. The handle portion 18 has an internal bore 21 adjacent the threaded end 19 for the reception of a spring member 22 which adjustably urges the flanged member 14 against the flanged member 8 and in turn against the cap member 11 by the use of a set screw 23 which is in turn secured in position by a second set screw 24. The aperture 12 in the cap member 11 has a tapered bore 26 to permit the probe 6 to deflect with respect to the handle portion 18 when sufficient force is applied to the end 27 of the probe 6. The amount of force necessary to deflect the probe will be determined by the strength of the spring 22 and the position of the set screw 23 as well as the diameter of the flange 9 and length of the probe 6. The set screw 23 may be adjusted by the use of a screwdriver or Allen wrench, not shown, extending into a substantially frusto-conical bore 28 in one end of the handle portion 18. When the desired setting of the set screw 23 in the internally threaded bore portion 20 of the handle portion 18 has been achieved, the second set screw 24 may be inserted into the threaded bore portion 20 of the handle 18 to insure that the set screw 23 remains in the desired adjusted position.

The test instrument may be used to apply tensile or compressive forces to any member under test by pushing or pulling on the object with the end of the test probe 6 which will deflect with respect to the handle 18 when a predetermined force is being applied to the article under test. The deflection will result when the force applied to the end 27 of the probe 6 times the lever arm, which will be equal in length to the length of the probe 6 from the tip 27 to the edge of the flange 9 adjacent the inside surface of the apertured end of the cap member 11, is greater than the force applied by the spring member 22 through the flanged member 14 times the length of its lever arm, which is equal to the distance from the indentation 17 to the outer periphery of the flange on the flanged member 14. The spring member 22 will cause the test probe 6 to return to its original position with respect to the handle portion 18 when the force is removed from the end of the probe 6.

It is obvious that the test probe may be used where certain predetermined tensile force is desired, or where a certain predetermined compressive force is desired since the instrument is symmetrical with respect to the longitudinal center line of the probe 6 and the same deflection will result regardless of how the force is applied as long as the force is applied substantially perpendicular to the longitudinal axis of the probe 6. It is conceivable that an instrument may be made which is not symmetrical with respect to the longitudinal center line of the probe 6 which would require varying forces to be applied depending on structure and the length of the relative lever arms.

It is also obvious that other means may be used, than those illustrated, to urge the test probe against the end of the handle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A test instrument comprising a substantially conically shaped probe having external threads adjacent one end thereof, an internally threaded member having a flange adjacent one end thereof secured to the external threads on said probe, an internally threaded cap member having an aperture in one end thereof, one portion of said internally threaded member extending through the aperture in said cap member with the flange thereon in engagement with said cap member and encompassed thereby, a substantially cylindrical handle portion, external threads adjacent one end of said handle portion to secure said cap member to said handle portion by the use of the internal threads in said cap member, a flanged member adjacent said internally threaded member and in engagement therewith, a spring urging said last-mentioned flanged member against said internally threaded member, internal threads in said handle portion, and adjustable screw means cooperating with said last-mentioned internal threads to secure said spring in said handle and in engagement with said flanged member, thereby permitting an end of said probe to deflect with respect to said handle portion when a predetermined force is applied thereto.

References Cited in the file of this patent

UNITED STATES PATENTS

| | | |
|---|---|---|
| 1,519,800 | Rifflard | Dec. 16, 1924 |
| 1,825,491 | Walters | Sept. 29, 1931 |
| 2,557,695 | Savoy | June 19, 1951 |
| 2,731,864 | Davies et al. | Jan. 24, 1956 |

FOREIGN PATENTS

| | | |
|---|---|---|
| 323,282 | Great Britain | Jan. 2, 1930 |